(12) United States Patent
Chang

(10) Patent No.: US 9,653,043 B2
(45) Date of Patent: May 16, 2017

(54) INPUT DEVICE FOR MAGNIFYING A SCREEN CONTENT AND METHOD THEREOF

(71) Applicant: DEXIN CORPORATION, New Taipei (TW)

(72) Inventor: Yuan-Jung Chang, New Taipei (TW)

(73) Assignee: DEXIN CORPORATION, New Taipei (TW)

(*) Notice: Subject to any disclaimer, the term of this patent is extended or adjusted under 35 U.S.C. 154(b) by 540 days.

(21) Appl. No.: 13/760,145

(22) Filed: Feb. 6, 2013

(65) Prior Publication Data

US 2014/0218406 A1 Aug. 7, 2014

(51) Int. Cl.
*G09G 5/373* (2006.01)
*G06F 3/0489* (2013.01)

(52) U.S. Cl.
CPC ........... *G09G 5/373* (2013.01); *G06F 3/0489* (2013.01); *G09G 2340/045* (2013.01)

(58) Field of Classification Search
CPC ........... G09G 2340/0407; G09G 5/391; G09G 5/373; G09G 2340/045; G06F 3/0489
USPC ........ 345/660, 661, 667, 156, 418; 715/788, 715/838; 709/206
See application file for complete search history.

(56) References Cited

U.S. PATENT DOCUMENTS

| 7,180,531 B2* | 2/2007 | Gery ................ G06F 9/4443 345/3.1 |
| 2003/0041110 A1* | 2/2003 | Wenocur et al. ............ 709/206 |
| 2003/0210281 A1* | 11/2003 | Ellis et al. .................... 345/838 |
| 2007/0033543 A1* | 2/2007 | Ngari et al. .................. 715/788 |
| 2010/0070912 A1 | 3/2010 | Zaman et al. |
| 2012/0287163 A1* | 11/2012 | Djavaherian ................. 345/667 |
| 2014/0232731 A1* | 8/2014 | Holland et al. ............... 345/531 |

* cited by examiner

*Primary Examiner* — Chante Harrison
(74) *Attorney, Agent, or Firm* — Li & Cai Intellectual Property (USA) Office

(57) ABSTRACT

A method for magnifying a screen content executed by an input device is disclosed. The method is suitable for magnifying a display content of a computer device and includes that the input device receives an informed command from the computer device. The informed command indicates whether the operation system of the computer device supports a system magnifier. If the operation system supports the system magnifier, the input device outputs a first magnification command to the computer device according to pressing of a function key. The computer device initializes the system magnifier of the operation system and magnifies the screen content according to the first magnification command. If the operation system doesn't support the system magnifier, the input device outputs a second magnification command provided by the input device to the computer device, so that the second magnification command magnifies the screen content according to the second magnification command.

9 Claims, 3 Drawing Sheets

INPUT DEVICE FOR MAGNIFYING A SCREEN CONTENT AND METHOD THEREOF

BACKGROUND

1. Field of the Invention

The present disclosure relates to an input device; in particular, to an input device of a computer device and a method for magnifying a screen content executed by the input device.

2. Description of Related Art

The development of current electronic products is on a trend of multi-function and compact outline. In order to provide a high quality image content for a display screen of an information product, the display screen is usually set at a display mode with higher resolution and therefore the display size of images and texts of the display screen is relatively small. It becomes inconvenient to view images of the display screen for either the people with bad visual acuity, such as a person with myopic eyes, presbyopia or lazy eyes, or the users who need to browse, observe in detail the images and texts of the display screen. However, operation systems of some current information products are equipped with function of a system magnifier so as to magnify the images of the display screen for a user to browse.

SUMMARY OF THE INVENTION

The object of the present disclosure is to provide an input device and a method for magnifying a screen content executed by the input device.

The method for magnifying a screen content executed by an input device is suitable for magnifying a screen content of a computer device. The method includes firstly that the input device receives an informed command from the computer device. The informed command indicates whether the operation system of the computer device supports a system magnifier. If the operation system supports the system magnifier, the input device outputs a first magnification command to the computer device according to pressing of a function key. The computer device then initializes the system magnifier provided by the operation system and magnifies the screen content according to the first magnification command. On the other hand, if the operation system does not support a system magnifier, the input device outputs a second magnification command provided by the input device to the computer device according to pressing of a function key, wherein the second magnification command serves to initialize a software magnifier to magnify the screen content.

According to one exemplary embodiment of the present disclosure, the computer device further includes an application software which has a software magnifier. The application software can also acquire version information of the operation system and generate the informed command including the version information.

Another aspect of the present disclosure is to provide a method for magnifying a screen content executed by an input device, and the method is suitable for magnifying a screen content of a computer device. The method includes firstly that the input device receives an informed command from the computer device. The informed command indicates whether the operation system of the computer device supports a system magnifier. If the operation system supports the system magnifier, the input device outputs a first magnification command or a second magnification command to the computer device according to pressing of a function key and a set value, wherein the set value is used to assign whether to use the first or the second magnification command for executing the screen content magnification. On the other hand, if the operation system does not support system magnifier, the input device outputs the second command to the computer device according to the pressing of a function key. The first magnification command initializes the system magnifier provided by the operation system to magnify the screen content. The second magnification command initializes a software magnifier to magnify the screen content.

Still another aspect of the present disclosure is to provide a method for magnifying a screen content executed by an input device, and the method is suitable for magnifying a screen content of a computer device. The method includes that, when a connection interface of the input device is coupled with the computer device, it is decided whether an operation system of the computer device supports a system magnifier according to a transmission signal which is received by the connection interface and outputted from the computer device. If the operation system supports the system magnifier, the input device outputs a first magnification command to the computer device according to pressing of a function key, so that the computer device then initializes according to the first magnification command the system magnifier provided by the operation system and magnifies the screen content. If the operation system does not support the system magnifier, the input device outputs a second magnification command to the computer device according to the pressing of a function key, wherein the second magnification command initializes a software magnifier to magnify the screen content.

According to one exemplary embodiment of the present disclosure, the input device further includes an application firmware which has a software magnifier. The application firmware can acquire version information of the operation system according to a transmission signal. The application firmware decides whether an operation system of the computer device supports a system magnifier according to the version information.

Still another aspect of the present disclosure is to provide an input device for magnifying a screen content, and the method is suitable for magnifying a screen content of a computer device. The input device includes a control unit, an input operation unit and a connection interface. The input operation unit is coupled to the control unit and has a function key. The connection interface is coupled to the control unit. The control unit decides whether an operation system of the computer device supports a system magnifier upon connection between the connection interface and the computer device. If the operation system supports the system magnifier, the input device outputs a first magnification command to the computer device according to pressing of a function key, therefore the computer device initializes the system magnifier provided by the operation system according to the first magnification command and magnifies the screen content. If the operation system does not support the system magnifier, the input device outputs a second magnification command provided by the input device to the computer device according to pressing of the function key, so that the computer device magnifies the screen content according to the second magnification command.

In summary, the input device receives the informed command or transmission signal from the computer device firstly, wherein the informed command or transmission signal indicates whether the operation system of the computer device supports the system magnifier. Thereafter the input device outputs the first or second magnification command to the computer device according to the pressing of a function key. The computer device then magnifies the screen content as instructed by the first or the second magnification command. The above-described mechanism facilitates both the cross-platform operation of the input device and the convenience of magnifying the screen content, so that the problem that an input device executes a screen content magnification under different operation systems can be effectively solved.

In order to further understand the feature and technical content of the present disclosure, the following embodiments are provided along with illustrations to facilitate the understanding of the present disclosure; however, the appended drawings are merely provided for reference and illustration, without any intention for limiting the scope of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

First Embodiment

Figure 1:
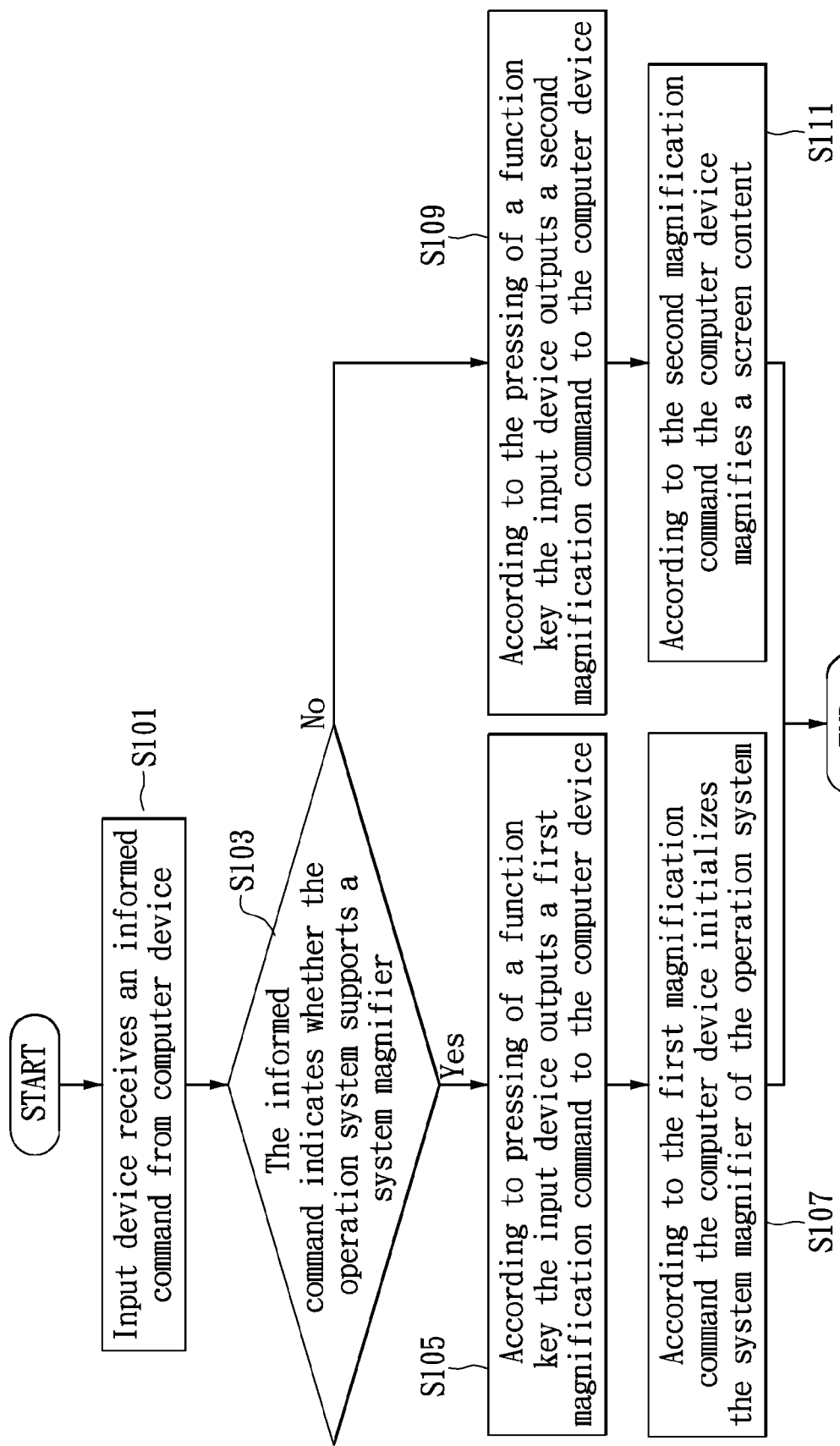
FIG. 1 is a flow chart of a method for an input device executing a screen content magnification in accordance with an embodiment of the present disclosure.

FIG. 1 is a flow chart of a method for an input device executing a screen content magnification in accordance with an embodiment of the present disclosure. Please refer to FIG. 1. The method for an input device executing screen content magnification suitable for magnifying a screen content of a computer device includes the following steps.

Firstly, in the step S101, the input device receives an informed command from the computer device. In practice, the input device can be such as a mouse, a keyboard or a computer plotting board, and the type of the input device of the present disclosure is not limited thereto. The interface between the computer device and a peripheral product such as the input device is specified, for example, by the Human Interface Device Class (HID Class) standard, so that the computer device can identify the function and identity of the peripheral products such as each input device etc. Of course, the computer device may also customize its own commands to notify the peripheral product such as the input device etc., so that the peripheral product such as the input device can acquire the informed command regarding whether the computer device supports a system magnifier.

Specifically, the computer device is installed with an application software which has a software magnifier. The application software acquires version information of the operation system in the computer device and generates an informed command according to the HID Class standard. In addition, the function provided by the software magnifier of the application software and the function of the system magnifiers of the operation system are the same, allowing a screen content magnification, thus they are not described here.

Subsequently, in the step S103, the operation system is notified by the informed command whether a system magnifier is supported. In practice, when the connection interface of the input device is coupled with the computer device, the input device receives the informed command from the computer device, wherein the informed command indicates whether the operation system of the computer device supports a system magnifier. For example, an operation system such as Windows Vista or higher version has the system magnifier. In contrast, an operation system such as Windows XP or lower version does not have the system magnifier.

Thus it is known that the input device acquires from the informed command the information whether the computer device supports the system magnifier. If the informed command indicates that the operation system supports the system magnifier, the steps S105 and S107 are carried out accordingly, and the input device transmits a first magnification command to the computer device. If, on the other hand, the informed command indicates that the system magnifier is not supported in the operation system, the steps S109 and S111 are carried out accordingly, and a second magnification command is transmitted to the computer device by the input device.

In the step of transmitting the first or the second magnification command by the input device, the input device of the present disclosure can execute the function of magnifying the screen content in different operation systems or versions, wherein the input device is notified by an informed command from the application software, and whether the first or second magnification command will be transmitted to the computer device by the input device is decided.

When the application software decides that the input device transmits the first magnification command to the computer device, i.e., in a procedure that the decision result in step S103 is "yes", the step S105 is executed and the input device outputs the first magnification command to the computer device according to pressing of a function key. In practice, when the operation system supports a system magnifier, the input device outputs the first magnification command to the computer device according the pressing of a function key, so that the computer device initializes according to the first magnification command the system magnifier provided by the operation system and magnifies the screen content.

Specifically, the input device outputs the first magnification command to the computer device, and the operation system of the computer device receives the first magnification command to initialize the system magnifier provided by the operation system. In addition, in other embodiments, when the operation system supports a system magnifier, the application software can set that the screen content magnification is executed by either the system magnifier or the software magnifier according to a set value. When the operation system supports the system magnifier, the input device outputs the first or second magnification command to the computer device according to the pressing of the function key and the set value of the application software, wherein the set value is set to use the first or second magnification command so as to carry out the screen content magnification. Thereby a user can use the set value to selectively initialize either the system magnifier or the software magnifier and thus magnify the screen content.

In this embodiment, the set value of the application software is set to initialize the system magnifier of the operation system as priority. In other embodiments, the set value of the application software may be set to initialize the software magnifier as priority. Alternatively, the set value of the application software is used to set the system magnifier or software magnifier according to the habit or requirement of a user. The type of the set value of the application software is not restricted in the embodiment.

It is worth mentioning that the first magnification command is a fast key signal of the operation system. In practice, the first magnification command includes a set of fast key signals. For example, the first magnification command may include fast key signals for initializing the system magnifier, a time delay signal and a fast key signal for adjusting the system magnifier. The fast key signal for initializing the system magnifier can be such as "Windows key" and "+" and the fast key signal for adjusting the system magnifier can be such as "Windows key" and "L". Therefore in step S107, the computer device initializes the system magnifier of the operation system according to the first magnification command. In addition, the magnified screen content can also be adjusted in full screen or non-full screen.

In another embodiment, the first magnification command can be a set of serial signals that can initialize the system magnifier and adjust the magnification factor of the system magnifier. For example, the first magnification command can be a fast key signal for "Windows key" and "+", a time delay signal and a fast key signal of the "Windows key" and "+" for adjusting the magnification factor. Thus the effects of initializing the system magnifier and adjusting the magnification factor are attained. The type of the first magnification command is not limited in this embodiment.

When the application software decides that the input device transmits the second magnification command to the computer device, i.e., in a procedure that the decision result in step S103 is "no", the step S109 is executed and the input device outputs a second magnification command to the computer device according to the pressing of a function key. In practice, when the system magnifier is not supported by the operation system, the input device outputs the second magnification command provided by the input device to the computer device, so that the screen content is magnified by the computer device according to the second magnification command.

Specifically, the input device outputs the second magnification command to the computer device and the application software receives the second magnification command and then initialize the software magnifier. In practice, the second magnification command can be the fast key signal of the application software. For example, the second magnification command can be a keying signal from the mouse or a Vender Command satisfying the USB Human Interface Device (HID) Class standard. The keying signal from the mouse can be a fourth keying signal, a fifth keying signal or a sixth keying signal, thereby the second magnification command is outputted to the application software, so that the application software initializes the software magnifier when the second magnification command is received. Hence in step S111 the computer device executes the software magnifier initialized by the second magnification command according to the application software and magnifies the screen content. However, it is to be understood that the type of the second magnification command is not limited to the aforementioned signal combination.

It is worth mentioning that under the execution of a screen content magnification by the input device, the computer device has to be installed with the application software which retrieves version information of the computer device, and an informed command is generated according to HID Class standard and transmitted to the input device. Subsequently the input device outputs the first or second magnification command to the computer device according to the pressing of a function key. Hence the input device is compatible to different operation systems and thereby attains the function of magnifying a screen content.

Second Embodiment

Figure 2:
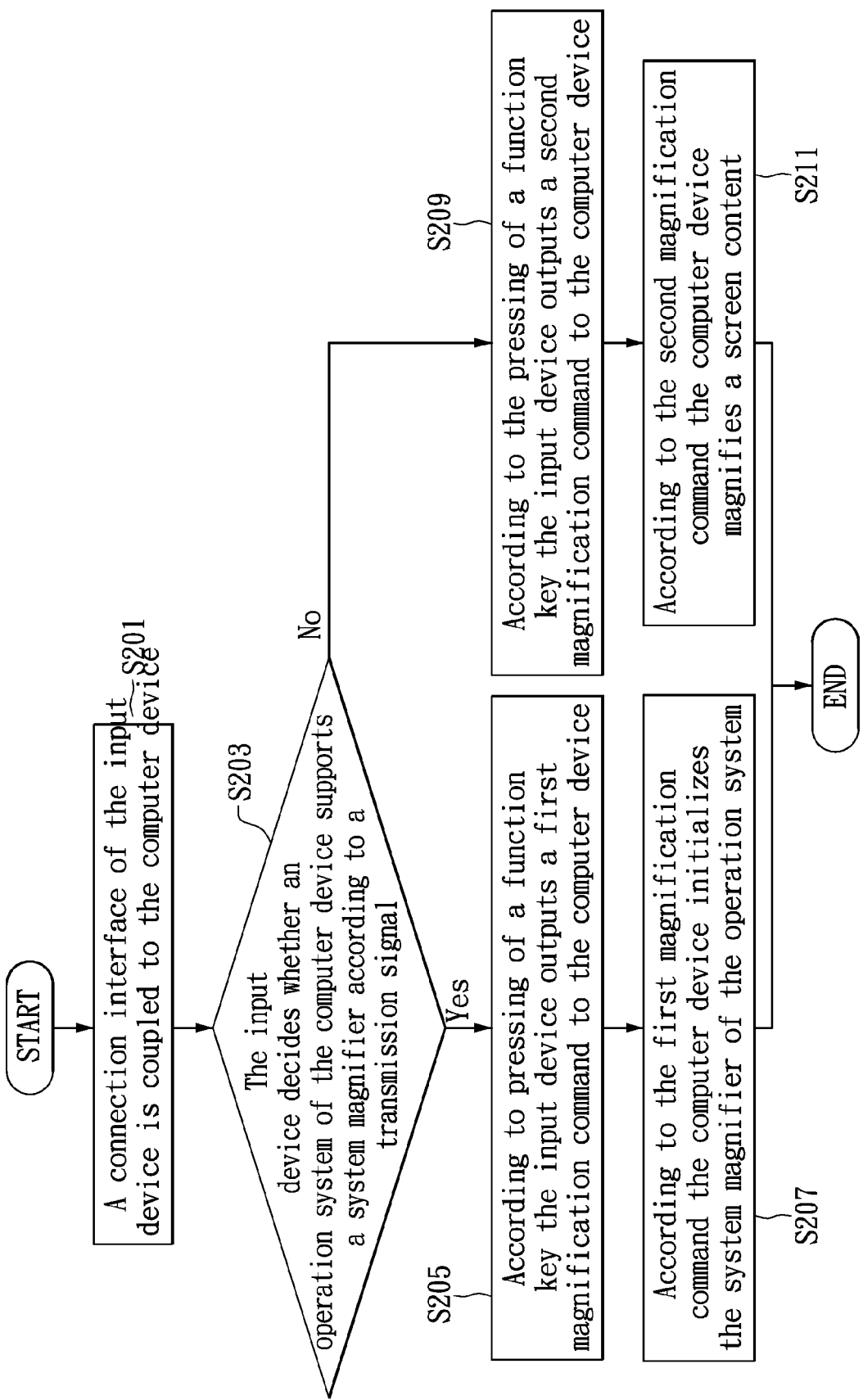
FIG. 2 is a flow chart of a method for an input device executing a screen content magnification in accordance with another embodiment of the present disclosure.

FIG. 2 shows a flow chart of a method for an input device executing a screen content magnification in accordance with a second embodiment. Please refer to FIG. 2. The method of magnifying a screen content by an input device is suitable for magnifying a screen content of a computer device, and the method includes the following steps.

Firstly, in step S201, a connection interface of the input device is coupled to the computer device. In practice, the connection interface can be such as a Universal Serial Bus (USB), Mini USB or Micro USB, and the connection interface type of the present disclosure is not limited thereto. The OS DESCRIPTORS of the input device states the device class, which is such as an HID class (e.g. 03h), Vendor ID obtained from the USB association (e.g. 046D), Product ID customized by the vendor (e.g. C517), or even a Version Number of a device. The identification information is provided so that the computer device can distinguish the function and identity of the input device when the computer device finds out that an input device is coupled.

Subsequently, in step S203, according to the transmission signal, the input device decides whether an operation system of the computer device supports a system magnifier. In practice, the input device decides whether the operation system of the computer device supports the system magnifier according to a transmission signal sent from the computer device and received by the connection interface. When the input device is coupled to the computer device via the connection interface, the input device can also decide the version information of the computer device.

It is supposed that the version of the input device is compatible with Windows Vista version of the computer device. When the input device is coupled with the computer device and the computer device supports the version of the input device, the OS DESCRIPTORS of the input device requests to return information of a valid OS_STRING, for example, the computer device with a Microsoft Windows Vista or higher version will provide a valid OS_STRING information to the input device. In contrast, if the computer system is not compatible to the version of the input device, the OS_STRING information requested to be returned in the OS DESCRIPTORS of the input device will be ignored by the computer device and a Registry value is used, for example, the computer device with Microsoft Windows XP or lower version information will use the Registry value, thereby the input device is able to decide whether the computer device is provided with a version higher than Windows Vista or a version lower than Windows XP. The connection type between the connection interface of the input device and the computer device is not limited in this embodiment.

Specifically, the input device includes an application firmware. According to the transmission signal the application firmware acquires the version information of the operation system. Then the application firmware decides whether the operation system of the computer device provides a system magnifier according to the version information.

It is worth mentioning that both operation systems of Apple or Microsoft have different detection mechanisms upon detecting the peripheral product such as an input device. For example, Apple operation system detects only a mouse but does not detect a keyboard when the input device is coupled with Apple operation system via the connection interface. Microsoft operation system detects a mouse firstly and then detects the keyboard when the input device is coupled with Microsoft operation system via the connection interface. Therefore, the input device is coupled with Apple or Microsoft operation system via the connection interface, and the input device decides whether Apple or Microsoft operation system is coupled according to the detection mechanism of Apple or Microsoft operation system.

According to the transmission signal, the input device acquires the information whether the computer device supports a system magnifier. When the transmission signal indicates that the operation system provides the system magnifier, steps S205 and S207 are further carried out, and the input device transmits the first magnification command to the computer device. If the transmission signal indicates that the operation system provides the system magnifier, steps S209 and S211 are carried out and the input device outputs the second magnification command to the computer device.

The transmission of the first or second magnification command from the input device allows the input device to magnify screen contents in different operation systems or versions, wherein the application firmware of the input device receives the transmission signal and decides whether the first or second magnification command will be transmitted to the computer device.

Subsequently, if the operation system supports the system magnifier, the application firmware decides that the input device will transmit the first magnification command to the computer device. That is to say, when the decision result of the step S203 is positive (i.e. yes), the process proceeds to step S205, in which the input device outputs the first magnification command to the computer device according to the pressing of a function key. In step S207, the computer device initializes the system magnifier provided by the operation system according to the first magnification command and magnifies the screen content.

When the application firmware decides that the operation system supports the system magnifier, the application firmware transmits the first magnification command to the computer device via the HID Class standard, while the first magnification command acts as the fast key signal of the operation system. The first magnification command used in this embodiment is identical to that in the first embodiment. Therefore, the detail is not repeated here.

In addition, if the system magnifier is not provided in the operation system, the application firmware decides that the second magnification command will be transmitted to the computer device by the input device. That is to say, when the decision result of step S203 is negative (i.e. no), step S209 is carried out. In step S209, the input device outputs the second magnification command to the computer device according to the pressing of a function key. In step S211, the computer device magnifies the screen content according to the second magnification command.

Specifically, when the application firmware decides that the operation system does not support the system magnifier, the input device outputs the second magnification command to the computer device according to the pressing of a function key, wherein the computer device includes an application software, which has a software magnifier. When the application software receives the second magnification command, the software magnifier is initialized by the application software. The second magnification command can be a mouse keying signal or a Vender Command. The second magnification command used in this embodiment is identical to that in the first embodiment. Therefore, the detail is not repeated here. In addition, the software magnifier has the same function as the system magnifier and can magnify the screen content. The detail is not repeated here.

Third Embodiment

Figure 3:
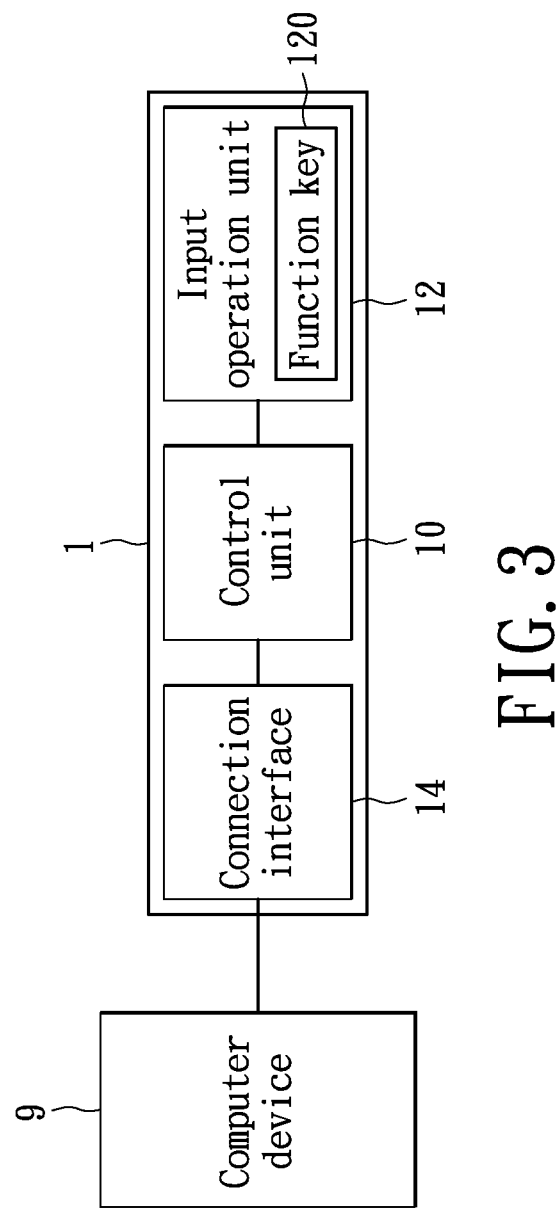
FIG. 3 is a block diagram showing an input device for magnifying a screen content in accordance with another embodiment of the present disclosure.

FIG. 3 is a block diagram showing the functions of an input device for magnifying a screen content. Please refer to FIG. 3. An input device 1 which may magnify a screen content is suitable for magnifying a screen content of a computer device 9. The input device 1 includes a control unit 10, an input operation unit 12 and a connection interface 14.

The control unit 10 is coupled between the input operation unit 12 and connection interface 14. In practice, the control unit 10 is such as Central Processing Unit (CPU) or Micro Processing Unit (MCU) and is used for executing the signal operation and processing of the input device 1. Upon the connection between the connection interface 14 and the computer device 9, the control unit 10 decides whether an operation system of the computer device 9 supports a system magnifier. The type of the control unit 10 is not limited in this embodiment.

The connection interface 14 is coupled to the control unit 10. In practice, the connection interface 14 can be a Universal Serial Bus (USB), a Mini USB or a Micro USB. Of course, a person skilled in the art can select freely the type of the connection interface 14.

The input operation unit 12 is coupled to the control unit 10 and includes a function key 120. In practice, the input operation unit 12 may be the left key, the right key, a scroll wheel, a motion sensor of a mouse or keys of a keyboard. Of course, when the input operation unit 12 is pressed, scrolled or moved, the corresponding input operation signal is generated and transmitted to the control unit 10. The person skilled in the art can understand the function of the input operation unit 12, so the function is not further elaborated here.

If the operation system supports the system magnifier, the input device 1 outputs a first magnification command to the computer device 9 according the pressing of a function key 120, so that the computer device 9 can initialize the system magnifier provided by the operation system according to the first magnification command and magnify the screen content. When the operation system does not support the system magnifier, the input device 1 outputs a second magnification command provided by the input device 1 to the computer device 9 according to the pressing of the function key 120, so that the computer device 9 is instructed by the second magnification command to magnify the screen content.

For example, the mouse has the function key 120. When a user needs to initialize the screen content magnification, the function key 120 is pressed by the user and the first or second magnification command is generated by the mouse and transmitted to the computer device 9. Hence the screen content is magnified. When the user needs to shut down the screen content, the function key 120 is pressed again by the user, then a shut down command is generated by the mouse and transmitted to the computer device 9, thereby the screen content of the original operation system is recovered.

In another embodiment, the function key 120 can be pressed more than once by a user to cyclically initialize, adjust and shut down the function of the system magnifier. For example, upon the first pressing of the function key 120, the mouse generates the first or second magnification command to the computer device 9 to magnify the screen content. Upon the second pressing of the function key 120, the magnification factor of the screen content is adjusted, for example, the magnification factor may be 3, 4, 5 or higher. When the function key 120 is pressed at the third time, the screen content of the original operation system is recovered. Of course, the function key 120 can also be set, for example, after being pressed for a certain period, the function key 120 will have. The type of the function key is not limited in this embodiment.

In summary, the method of this disclosure discloses that an input device receives an informed command or a transmission signal from a computer device, wherein the informed command or the transmission signal indicates whether the operation system of the computer device supports a system magnifier, thus the input device outputs a first or a second magnification command to the computer device according to the pressing of a function key, so that the computer device can magnify the screen content according to the first or the second magnification command. The above-described mechanism facilitates both the cross-platform operation of the input device and the convenience of magnifying the screen content, so that the problem that an input device executes a screen content magnification under different operation systems can be effectively solved.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A method for magnifying a screen content executed by an input device, the method being suitable for magnifying a screen content of a computer device, the input device comprising a control unit, a input operation unit with a function key and a connection interface, the control unit being coupled between the input operation unit and the connection interface, the connection interface being for coupling to the computer device, and the method comprising:

the computer device including an application software with the software magnifier, and the application software acquiring version information of an operation system and generating an informed command including the version information;

the input device receiving the informed command from the computer device, wherein the informed command indicates whether the operation system of the computer device supports a system magnifier;

if the operation system supports the system magnifier, the control unit of the input device outputting a first magnification command to the computer device according to pressing of the function key, the computer device then initiating the system magnifier provided by the operation system and magnifying the screen content according to the first magnification command, wherein the first magnification command includes a fast key signal for initiating the system magnifier, a time delay signal and a fast key signal for adjusting the system magnifier; and if the operation system does not support the system magnifier, the control unit of the input device outputting a second magnification command provided by the input device to the computer device according to the pressing of the function key, wherein the second magnification command initiates a software magnifier to magnify the screen content.

2. The method according to claim 1, wherein the input device outputs the second magnification command to the computer device, and the application software receives the second magnification command and initiates the software magnifier.

3. The method according to claim 1, wherein the second magnification command is a mouse keying signal or a Vender Command.

4. A method for magnifying a screen content executed by an input device, the method being suitable for magnifying a screen content of a computer device, the input device comprising a control unit, a input operation unit with a function key and a connection interface, the control unit being coupled between the input operation unit and the connection interface, the connection interface being for coupling to the computer device, and the method comprising:

the computer device including an application software with the software magnifier and a set value, and the application software acquiring version information of an operation system and generating an informed command including the version information;

the input device receiving an informed command from the computer device, wherein the informed command indicates whether the operation system of the computer device supports a system magnifier;

if the operation system supports the system magnifier, the control unit of the input device outputting a first or a second magnification command to the computer device according to pressing of the function key and the set value, wherein the set value is used to assign whether to use the first or the second magnification command for executing the screen content magnification; and if the operation system does not support the system magnifier, the control unit of the input device outputting the second magnification command to the computer device according to the pressing of the function key;

wherein the first magnification command is used to initiate the system magnifier of the operation system for magnifying the screen content, while the second magnification command is used to initiate a software magnifier for magnifying the screen content, wherein the first magnification command includes fast key signals for initiating the system magnifier, a time delay signal and a fast key signal for adjusting the system magnifier.

5. The method according to claim 4, wherein the second magnification command is a mouse keying signal or a Vender Command.

6. A method for magnifying a screen content executed by an input device, the method being suitable for magnifying a screen content of a computer device, the input device comprising a control unit, a input operation unit with a function key and a connection interface, the control unit being coupled between the input operation unit and the connection interface, the connection interface being for coupling to the computer device, and the method comprising:

when a connection interface of the input device is coupled with the computer device, deciding whether an operation system of the computer device supports a system magnifier according to a transmission signal received by the connection interface and outputted by the computer device;

the computer device including an application software with the software magnifier, and the application software acquiring version information of the operation system and generating an informed command including the version information;

the input device receiving the informed command indicating whether the operation system of the computer device supports a system magnifier;

if the operation system supports the system magnifier, the control unit of the input device outputting a first magnification command to the computer device according to pressing of the function key, so that the computer device then initiates according to the first magnification command the system magnifier provided by the operation system and thereby magnifies the screen content, wherein the first magnification command includes fast key signals for initiating the system magnifier, a time delay signal, and a fast key signal for adjusting the system magnifier; and if the operation system does not support the system magnifier, the control unit of the input device outputting a second magnification command provided by the input device to the computer device according to the pressing of the function key, wherein the second magnification command initiates a software magnifier and thereby magnifies the screen content.

7. The method according to claim 6, wherein the software magnifier upon receiving the second magnification command, the application software initiates the software magnifier.

8. The method according to claim 6, wherein the second magnification command is a mouse keying signal or a Vender Command.

9. An input device for magnifying a screen content, the input device being suitable for magnifying a screen content of a computer device and comprising:

a control unit;

an input operation unit coupled to the control unit and having a function key; and a connection interface coupled to the control unit;

wherein when the connection interface is connected with the computer device, the control unit decides whether an operation system of the computer device supports a system magnifier;

wherein the computer device includes an application software with the software magnifier, and the application software acquires version information of the operation system and generates an informed command including the version information and indicating whether the operation system of the computer device supports a system magnifier;

if the operation system supports the system magnifier, the control unit of the input device outputting a first magnification command to the computer device according to pressing of the function key, so that the computer device initiates the system magnifier provided by the operation system according to the first magnification command and thereby magnifies the screen content, wherein the first magnification command includes a fast key signal for initiating the system magnifier, a time delay signal and a fast key signal for adjusting the system magnifier; and if the operation system does not support the system magnifier, the control unit of the input device outputting a second magnification command provided by the input device to the computer device according to the pressing of the function key, so that the computer device magnifies the screen content according to the second magnification command.

* * * * *